United States Patent Office 3,697,489
Patented Oct. 10, 1972

3,697,489
HIGH TEMPERATURE NITRILE ELASTOMER
Rajendra N. Chadha, Farmingdale, N.Y., and Ralph P. Arthur, George C. Schweiker, and Carroll R. Shingleton, Parkersburg, W. Va., assignors to Borg-Warner Corporation, Chicago, Ill.
No Drawing. Continuation-in-part of application Ser. No. 851,471, Aug. 19, 1969. This application Aug. 5, 1970, Ser. No. 61,439
Int. Cl. C08f 15/40
U.S. Cl. 260—80.7                                    6 Claims

ABSTRACT OF THE DISCLOSURE

An improved nitrile elastomer having superior high heat properties. This class of elastomers is constituted by tetrapolymers which are prepared by copolymerizing butadiene, acrylonitrile, $\alpha$-chloroacrylonitrile and an alkyl acrylate by means of a redox emulsion process, and then vulcanizing or curing the elastomers in a conventional manner.

Background and summary of the invention

This application is a continuation-in-part of Ser. No. 851,471, now abandoned, filed Aug. 19, 1969 by Ralph P. Arthur et al.

Prior to the present invention, a great number of polymers and copolymers have been made for use in high temperature applications. While the uses are practically limitless, the most common are gasket materials, seals, grommets, bushings, tubing, cable and wire sheathing, and O-rings, particularly in the automotive and aircraft fields. Many of the modified nitrile rubbers which are found in commercial uses at the present time have reasonably good high temperature physical properties, such as oil resistance, tensile strength and resiliency, etc. However, as the demand for such materials has increased, many attempts have been made to augment the high temperature physical properties of nitrile elastomers.

The present invention proposes a polymer prepared from at least four monomers including a conjugated diene such as butadiene-1,3, a polymerizable alkyl acrylate, acrylonitrile and $\alpha$-chloroacrylonitrile. All four components are copolymerized by means of a standard redox emulsion polymerization system; and, after approximately 80% conversion, the dried coagulum is cured to produce the improved elastomer.

It is, therefore, a principal object of the invention to provide an improved nitrile elastomer having greater tensile strength and resiliency at elevated temperatures.

Another object of the invention is to provide an improved tetrapolymer in a class of nitrile elastomers containing 30 to 90 parts butadiene, 10 to 50 parts acrylonitrile, 1 to 9 parts $\alpha$-chloroacrylonitrile, and 1 to 9 parts of an alkyl acrylate of the formula

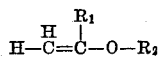

wherein: $R_1$ is selected from the group consisting of hydrogen and methyl radical; and $R_2$ is a $C_1$–$C_8$ alkyl radical.

Still another object of the invention is to provide a vulcanized nitrile elastomer having improved aging properties, particularly at high temperatures, for example, at 300° F.

Additional objects and advantages will become apparent from reading the following detailed description of the invention.

Detailed description of the invention

This invention will be more clearly understood from reading the following examples which set forth a number of the exemplary tetrapolymers prepared in accordance with the present invention. In each of the examples, all parts are by weight, unless otherwise indicated.

EXAMPLE I

An emulsion was prepared from the following recipe:

| | |
|---|---:|
| DM water | 142 |
| Potassium hydroxide | 0.132 |
| Potassium chloride | 0.5 |
| Sodium formaldehyde hydrosulfite | 0.2 |
| Disodium salt EDTA | 0.15 |
| Sodium salt of lauryl alcohol sulfate | 4.5 |
| Ferrous sulfate | 0.0024 |
| Ammonium persulfate | 0.2 |
| Mixed tert. mercaptans | 0.4 |
| Butadiene-1,3 (BD) | 65.0 |
| Acrylonitrile (ACN) | 30.0 |
| $\alpha$-Chloroacrylonitrile ($\alpha$-CLAN) | 2.0 |
| Ethyl acrylate (EA) | 5.0 |

The emulsion prepared of the above monomers was placed in a pressure container and the persulfate catalyst added. The container was agitated in a thermostated batch for 16 hours at 20° C. Polymerization was arrested by addition of a conventional shortstop, such as sodium dimethyldithiocarbamate, to stop the polymerization at 70–80% conversion. The latex was coagulated using $Al_2(SO_4)_3$ and dried in a hot air oven at 100° C. The tetrapolymer coagulum, after thorough drying, was then compounded with carbon black on a roll mill using the following system:

| | |
|---|---:|
| Tetrapolymer | 100 |
| Stearic acid | 1.0 |
| Carbon black | 50.0 |
| Sulfur | 0.3 |
| Zinc oxide | 5.0 |
| Mercaptobenzothiazyl disulfide | 2.0 |
| Dibutoxymethoxyethyl adipate | 10.0 |
| Tetramethylthiuram disulfide | 1.0 |

After compounding, the rubber was cured in an ASTM mold at 310° F.

Example I was repeated while varying the composition of the four primary monomers and, in some cases, eliminating the $\alpha$-chloroacrylonitrile and/or the ethyl acrylate. These examples are listed in Table I below.

TABLE I

| Example: | BD | ACN | $\alpha$-CLAN | EA |
|---|---:|---:|---:|---:|
| I | 65.0 | 30.0 | 2.0 | 5.0 |
| II | 65.0 | 30.0 | 5.0 | 1.0 |
| III | 70.0 | 30.0 | | |
| IV | 43.0 | 50.0 | 2.0 | 5.0 |
| V | 48.0 | 45.0 | 2.0 | 5.0 |
| VI | 53.0 | 40.0 | 2.0 | 5.0 |
| VII | 70.0 | 15.0 | 15.0 | |
| VIII | 70.0 | | 30.0 | |
| IX | 70.0 | 20.0 | 10.0 | |
| X | 68.0 | 29.0 | 3.0 | |
| XI | 70.0 | 18.0 | 12.0 | |
| XII | 65.0 | 30.0 | | 5.0 |
| XIII | 65.0 | 25.0 | | 10.0 |
| XIV | 60.0 | 25.0 | | 15.0 |

To illustrate the improved aging properties of the various examples listed above which incorporate $\alpha$-chloroacrylonitrile and ethyl acrylate, reference is made to Table II below.

TABLE II

| | Original cured properties | | | |
|---|---|---|---|---|
| | Tensile sterngth (p.s.i.) | Percent elongation | Tear strength (p.s.i.) | Hardness Shore A |
| Example: | | | | |
| I | 3,500 | 420 | 204 | 71 |
| II | 3,550 | 370 | 211 | 72 |
| III | 3,500 | 410 | 215 | 71 |
| IV | 3,800 | 410 | 220 | 75 |
| V | 3,700 | 440 | 226 | 74 |
| VI | 3,500 | 440 | 223 | 69 |
| VII | (1) | | | |
| VIII | (1) | | | |
| IX | 2,800 | 190 | | 84 |
| X | 3,200 | 410 | 216 | 72 |
| XI | 2,400 | 120 | | 84 |
| XII | 3,400 | 480 | 220 | 74 |
| XIII | 2,400 | 300 | 175 | 77 |
| XIV | 1,800 | 210 | 135 | 78 |
| After aging for 70 hours at 300° F. (zir oven) | | | | |
| I | 1,900 | 130 | 115 | 91 |
| II | 1,750 | 110 | 113 | 89 |
| III | 800 | 60 | 103 | 91 |
| IV | 2,600 | 90 | 185 | 89 |
| V | 2,350 | 100 | 172 | 88 |
| VI | 2,080 | 120 | 168 | 90 |
| VII | (1) | | | |
| VIII | (1) | | | |
| IX | (2) | | | |
| X | 1,000 | 40 | 102 | 90 |
| XI | (2) | | | |
| XII | 900 | 50 | 119 | 92 |
| XIII | 1,100 | 55 | 102 | 92 |
| XIV | 1,000 | 50 | 88 | 92 |

1 Too stiff to mold.
2 Very brittle, could not be tested.

In the above examples, it should be noted that the materials which were prepared in accordance with the present invention, namely Examples I, II, and IV to VI, exhibit exceptionally good aging properties in hot air. Example III corresponds to a conventional nitrile rubber containing only butadiene and acrylonitrile in a proportion of 70 parts butadiene and 30 parts acrylonitrile. In the case of the latter, the tensile strength dropped from 3500 p.s.i. to 800 p.s.i. after aging in hot air for 70 hours. This is to be compared with an average of only about 50% decrease in tensile strength for Examples I and II.

As pointed out above, other acrylic acid esters besides ethyl acrylate may be utilized in this invention. Such materials possess the structure:

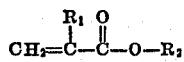

wherein: $R_1$ is hydrogen or methyl radical; and $R_2$ is a $C_1$-$C_8$ alkyl radical.

In order to illustrate the operability of such additional alkyl acrylates, Example I was repeated utilizing methyl methacrylate (MMA), butyl acrylate (BA), and 2-ethylhexyl acrylate (EHA) in accordance with the following table:

TABLE III

| | BD | ACN | α-CLAN | MMA | BA | EHA |
|---|---|---|---|---|---|---|
| Example: | | | | | | |
| XV | 65 | 30 | 2 | 5 | | |
| XVI | 65 | 30 | 2 | | 5 | |
| XVII | 65 | 30 | 2 | | | 5 |

After compounding as described above, the materials were cured for fifteen minutes at 340° F. The original and air aged (70 hours at 275° F.) properties are compared in the following table:

TABLE IV

| | Original properties | | |
|---|---|---|---|
| Example | XV | XVI | XVII |
| Tensile (p.s.i.) | 3,230 | 3,265 | 3,340 |
| Modulus (100%) | 235 | 275 | 250 |
| Modulus (300%) | 1,290 | 1,480 | 1,455 |
| Elongation (percent) | 525 | 535 | 520 |
| Tear "C" (lbs.) | 217 | 210 | 213 |
| Hardness "A" | 64 | 64 | 63 |
| Air aged properties | | | |
| Tensile (p.s.i.) | 2,615 | 2,125 | 1,950 |
| Elongation (percent) | 200 | 150 | 150 |
| Tear "C" (lbs.) | 141 | 138 | 135 |
| Hardness "A" | 81 | 82 | 81 |

It should be pointed out that there are some references in the prior art to alkyl acrylate modifiers for nitrile rubbers, which are mostly terpolymers. One such reference is U.S. Pat. 2,395,017 issued to W. L. Semon on Feb. 19, 1946. In Example 14 of Semon, there is described a terpolymer vulcanizate containing 55% butadiene-1,3, 40% acrylonitrile and 5% ethyl acrylate. The example most closely corresponding to Semon Example 14 is Example XII. While the improvement to the aging properties imparted by a small amount of α-chloroacrylonitrile is not completely understood, it should be noted that whereas the composition of Example XII had a cured tensile strength of 3400 p.s.i., it fell off to 900 p.s.i. after aging in hot air. This should be compared to a much smaller reduction in tensile strength of the tetrapolymer in Example I, i.e., 3500 p.s.i. to 1900 p.s.i. when subjected to the same hot air aging.

In general, the useful range for the materials described herein is as follows: 90 to 30 parts butadiene; 10 to 50 parts acrylonitrile; 1 to 9 parts α-chloroacrylonitrile; and 1 to 9 parts alkyl acrylate. The preferred compositions include tetrapolymers having the monomers in the following proportions: 70 to 40 parts butadiene; 15 to 50 parts acrylonitrile; 2 to 5 parts α-chloroacrylonitrile; and 2 to 5 parts alkyl acrylate.

In describing the emulsion system and the curing process, mention has been made of certain specific stabilizers, emulsifiers, curing agents, and polymerization initiators. However, any of the conventional redox polymerization and curing systems may be used with comparable results.

While the invention has been described in connection with certain specific embodiments thereof, it is to be understood that this is by way of illustration and not by way of limitation; and the scope of the appended claims should be construed as broadly as the prior art will permit.

What is claimed is:

1. A random, solid tetrapolymer having improved high temperature aging properties consisting, by weight, essentially of 30 to 90 parts butadiene, 10 to 50 parts acrylonitrile, 1 to 9 parts α-chloroacrylonitrile, and 1 to 9 parts of an alkyl acrylate having the formula

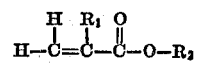

wherein: $R_1$ is selected from the group consisting of hydrogen and methyl radical; and $R_2$ is a $C_1$-$C_8$ alkyl radical.

2. The composition as defined in claim 1 consisting, by weight, essentially of 70 to 40 parts butadiene, 15 to 50 parts acrylonitrile, 2 to 5 parts α-chloroacrylonitrile, and 2 to 5 parts of said alkyl acrylate.

3. The composition as defined in claim 1 wherein said alkyl acrylate is ethyl acrylate.

4. The composition as defined in claim 1 wherein said alkyl acrylate is methyl methacrylate.

5. The composition as defined in claim 1 wherein said alkyl acrylate is butyl acrylate.

6. The composition as defined in claim 1 wherein said alkyl acrylate is 2-ethylhexyl acrylate.

References Cited

UNITED STATES PATENTS

| | | | |
|---|---|---|---|
| 2,395,017 | 2/1946 | Semon | 260—84.5 |
| 3,047,548 | 7/1962 | Garrett | 260—80.7 |
| 3,426,102 | 2/1969 | Solaot et al. | 260—899 |

JOSEPH L. SCHOFER, Primary Examiner

S. M. LEVIN, Assistant Examiner

U.S. Cl. X.R.

260—23.7 M, 82.5